Oct. 27, 1970     H. R. GREENLEE     3,535,707
WELDING HELMET AND THE LIKE
Filed March 3, 1969                9 Sheets-Sheet 7

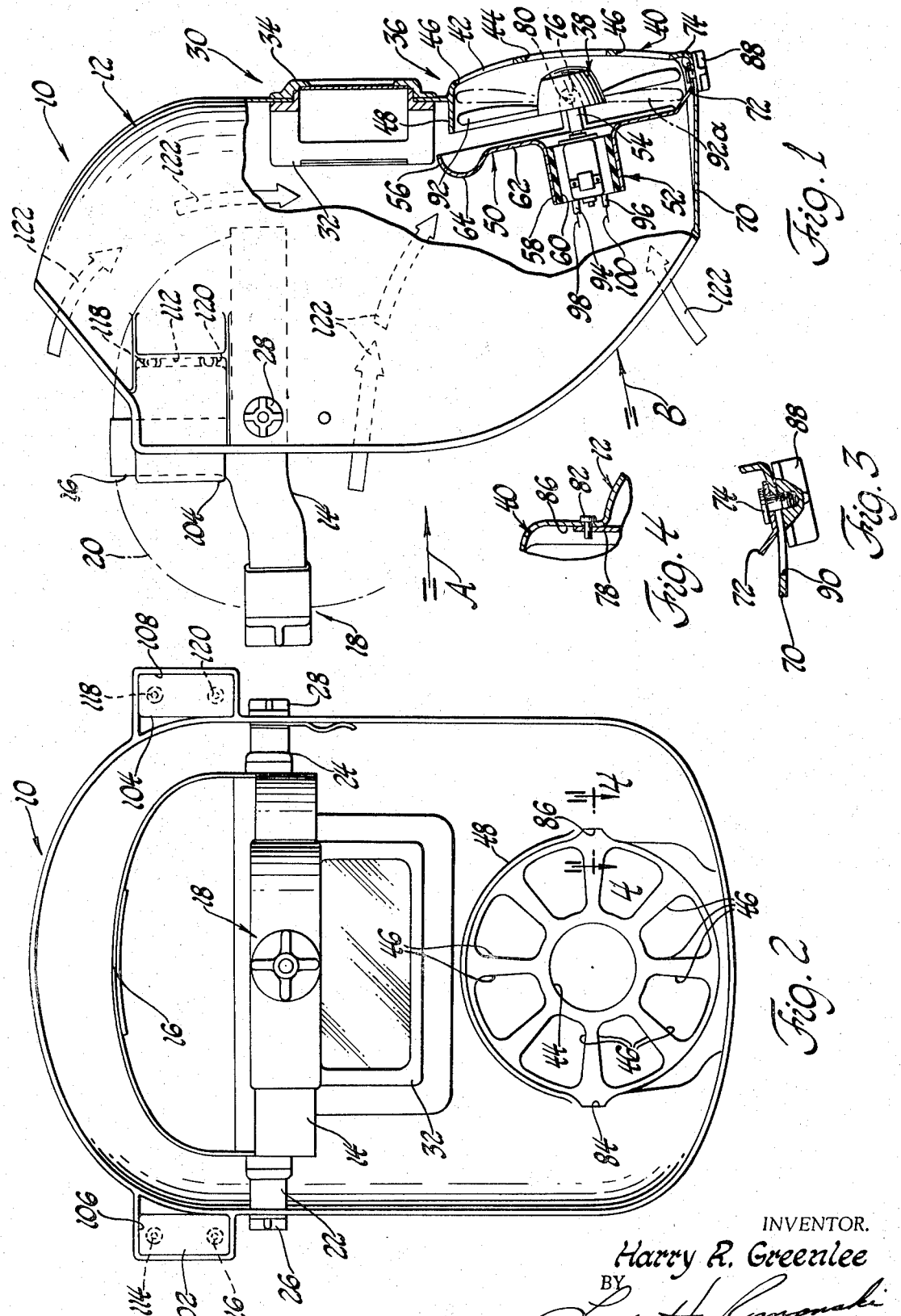
Oct. 27, 1970     H. R. GREENLEE     3,535,707
WELDING HELMET AND THE LIKE
Filed March 3, 1969     9 Sheets-Sheet 1
INVENTOR.
Harry R. Greenlee
ATTORNEY

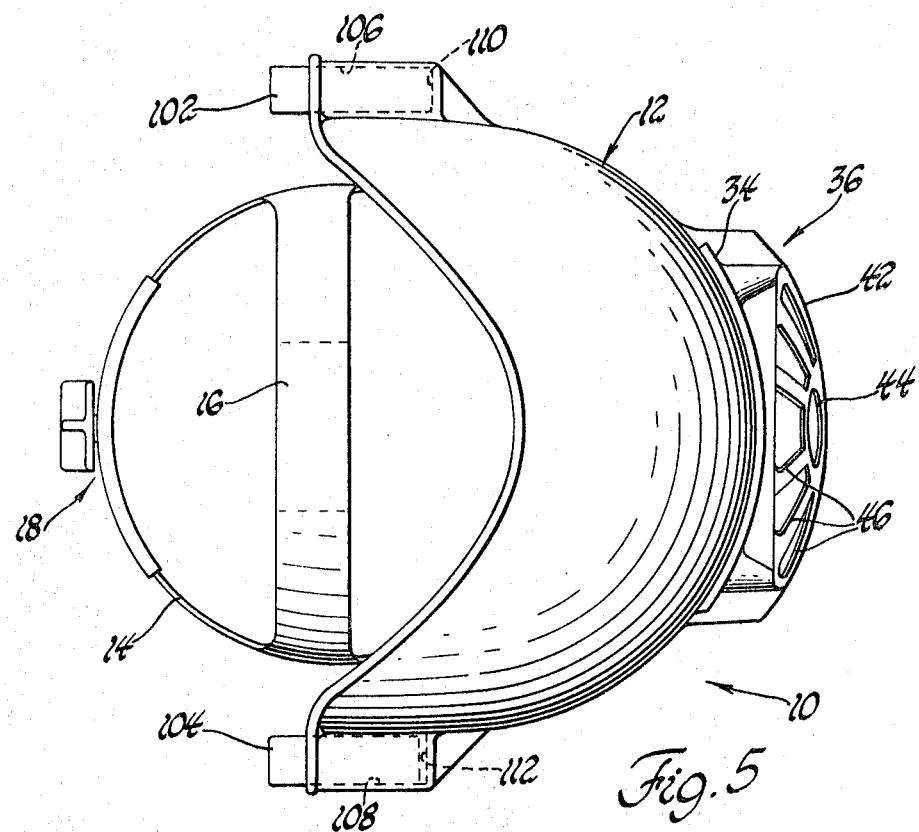
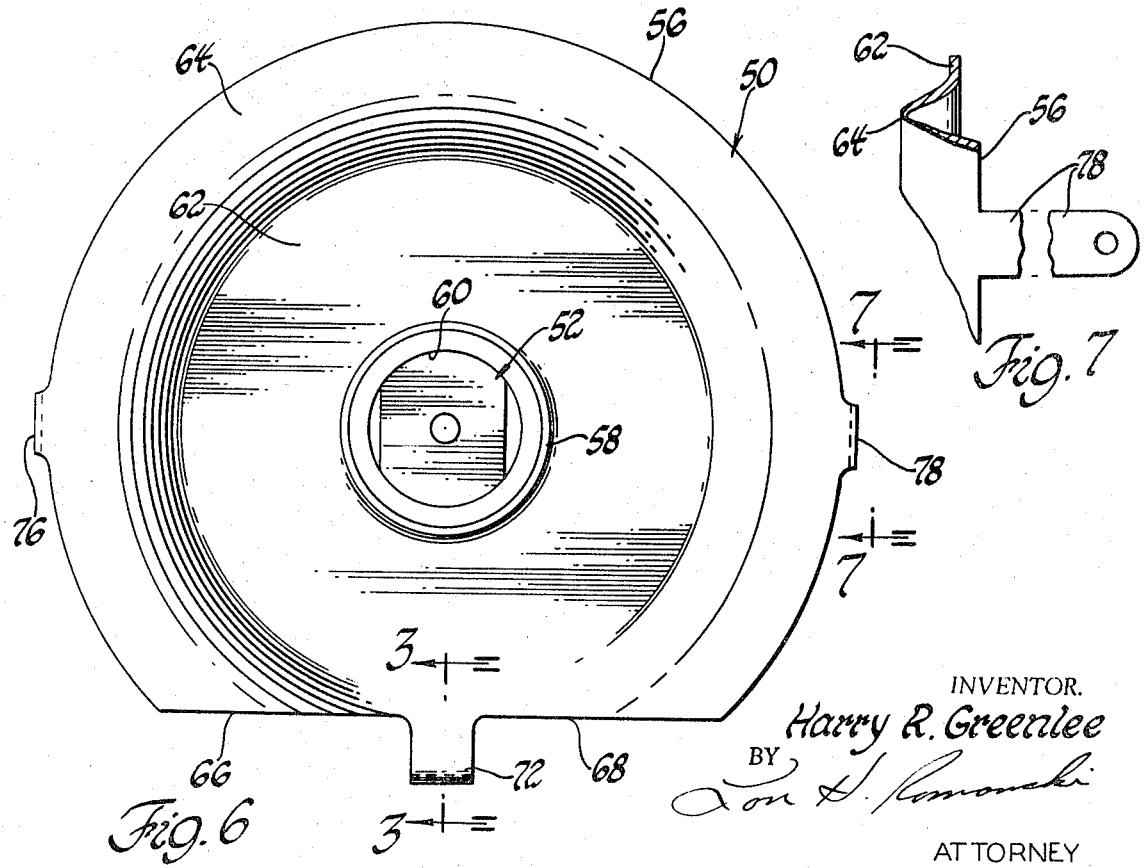

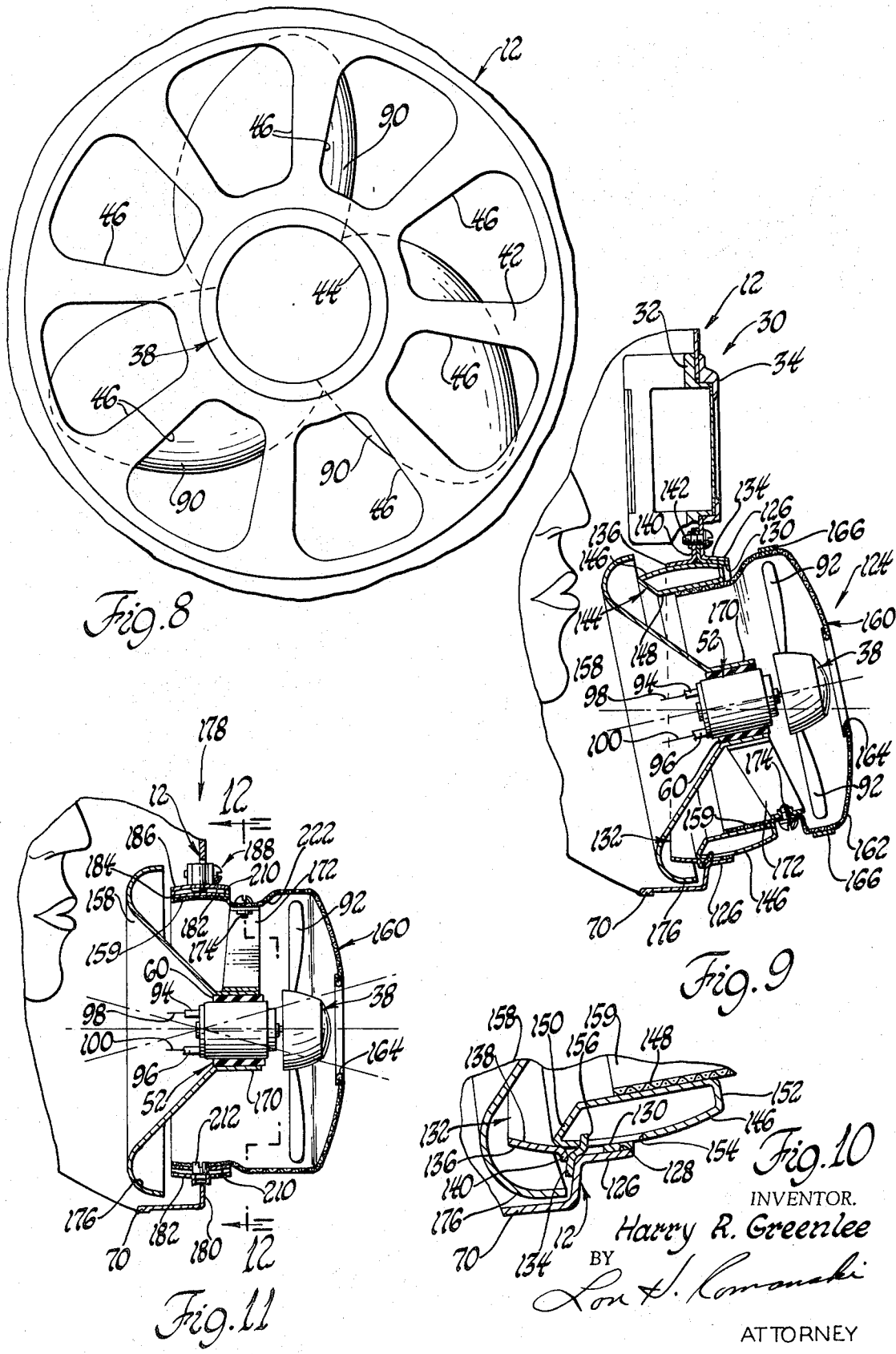

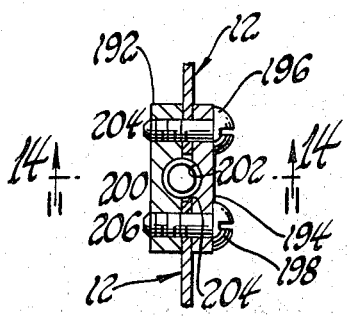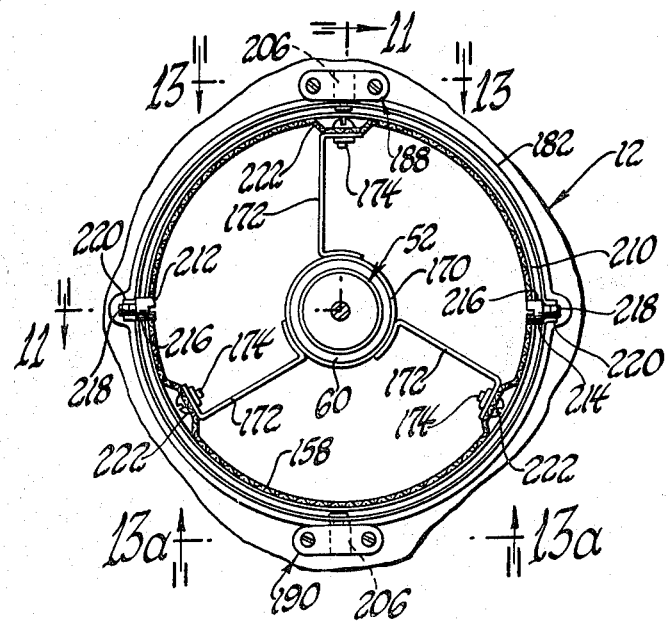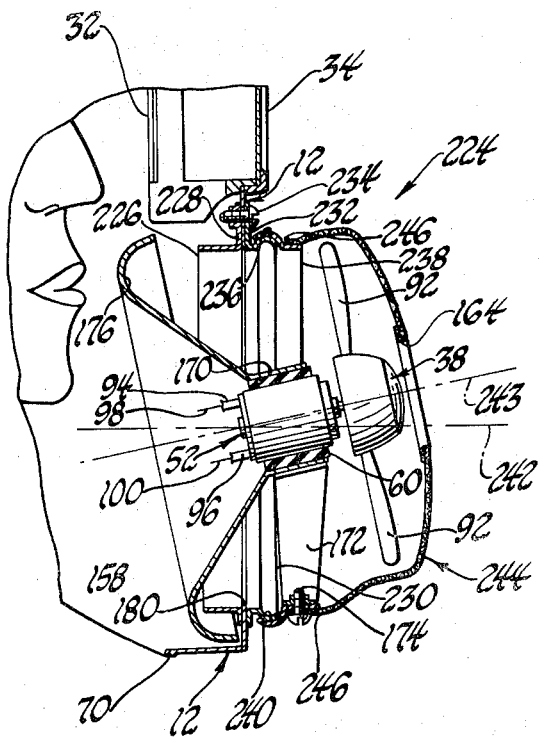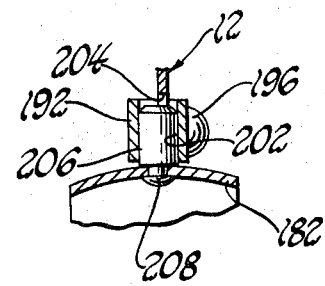

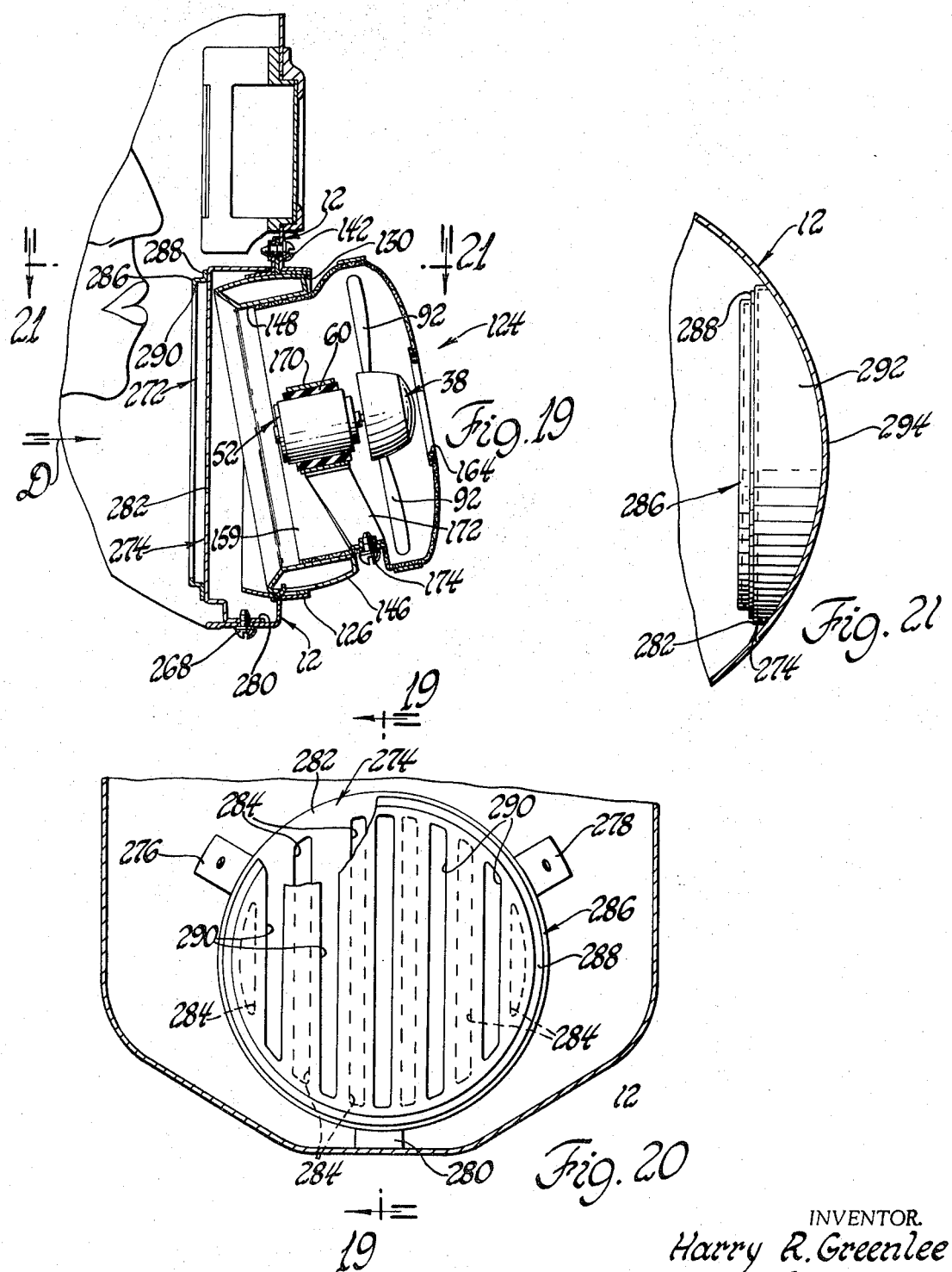

INVENTOR.
Harry R. Greenlee
BY
ATTORNEY

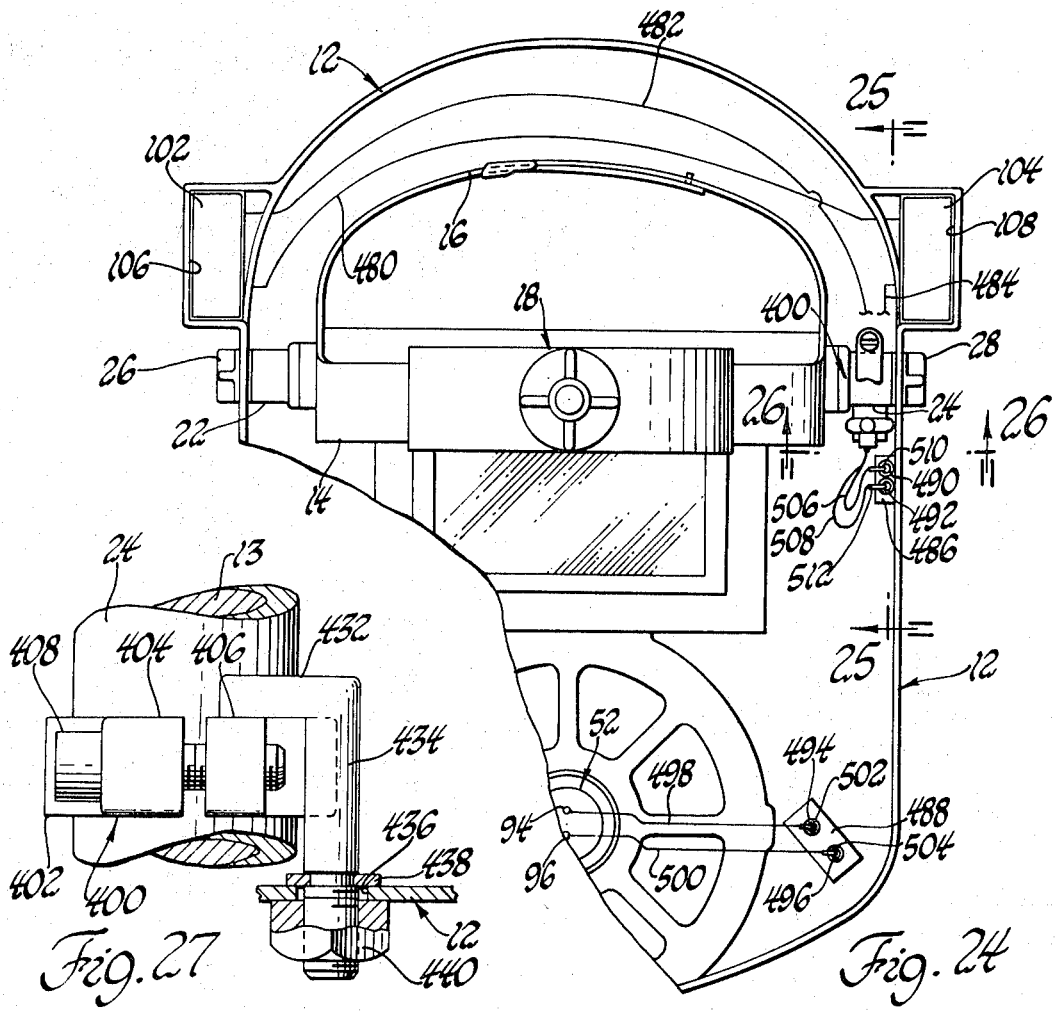
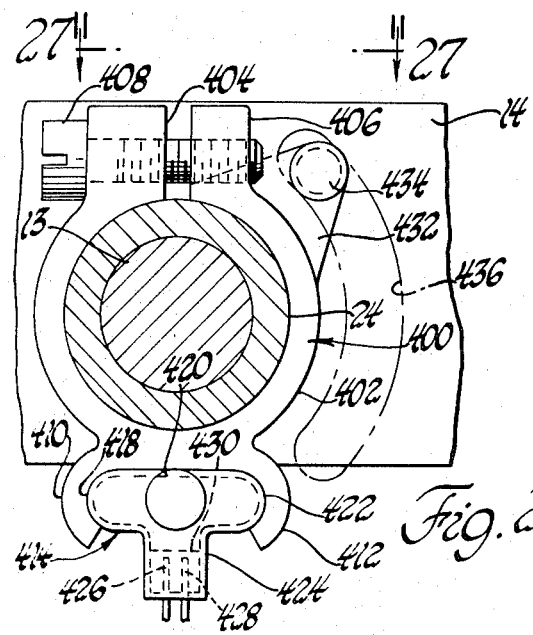
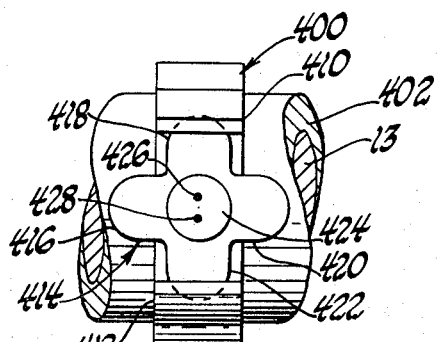

Oct. 27, 1970   H. R. GREENLEE   3,535,707
WELDING HELMET AND THE LIKE
Filed March 3, 1969   9 Sheets-Sheet 9

INVENTOR.
Harry R. Greenlee
BY
Lon H. Romanski
ATTORNEY

United States Patent Office 3,535,707
Patented Oct. 27, 1970

3,535,707
WELDING HELMET AND THE LIKE
Harry R. Greenlee, Detroit, Mich., assignor to Trison Corporation, Roseville, Mich., a corporation of Michigan
Filed Mar. 3, 1969, Ser. No. 803,767
Int. Cl. A61f 9/06
U.S. Cl. 2—8     27 Claims

ABSTRACT OF THE DISCLOSURE

A protective helmet having a face shielding mask portion pivotally supported on an inverted-like cradle adapted to be carried on an operator's head is provided with a forwardly directed aperture, below the operator's normal line of vision, in which is situated a pivotally mounted fan assembly for drawing fresh air into the mask generally about the operator's head and expelling such air through the forwardly directed opening in a stream-like path aimed at a selected direction with respect to the mask.

BACKGROUND OF THE INVENTION

It is well known to those who have performed any welding operations, especially electric arc welding, that such operations necessarily create dense fumes, smoke, sparks and heat. Because of these, the welder's efficiency is impaired, the quality of the weld is often diminished and the health is often threatened.

For example, it has been determined in many instances that respiratory ailments and lung damage have occurred because of the direct inhalation of such smoke or noxious fumes. Yet, the welding helmets of the prior art presently being employed are not at all effective for preventing the welding operator from having to inhale such weld-generated fumes and smoke. In many industries where welding is employed as the prime means of metal joining, such as in ballistic or armament welding, the welding operator spends substantially all of his work shift period wearing the mask and breathing such smoke and fumes.

Further, because of the presence of such heat, fumes and smoke, the welder's efficiency is reduced. That is, it has been observed that because of the heat within the mask or helmet, the welder's face, and brow perspire profusely resulting in perspiration flowing down into the welder's eyes thereby impairing his ability to continue that particular weld pass until he first stops, lifts the helmet and wipes away such perspiration. This, of course, not only reduces his total productivity but also reduces the quality of the weld because of the interruption in the weld pass.

Such interruptions in the weld pass also result from the dense smoke and fumes generated during the welding operation. That is, it has been found that because of the extremely dense smoke in the vicinity of the weld puddle the operator is often unable to clearly see the quality or formation of the weld bead being generated. The operator, therefore, interrupts the weld pass and lifts his helmet and fans the smoke away in order to see weld characteristics. It should be apparent that if the operator does not so interrupt the weld pass he is taking the risk that the entire weld joint may be defective; however, if he does interrupt the weld pass he has immediately reduced the quality of the weld.

It is common practice to provide in such welding helmets an inner mounted dark tinted or Polaroid lense and an outer clear glass lense. This is done in order to protect the more costly inner lense from becoming pitted by sparks and weld spatter. It has been found that because of the fumes the welder must periodically stop his normal welding operations in order to wipe and clean the outer surface of the outer lense because the fumes so cloud the said surface as to seriously impair his vision. Further, the flying sparks and weld spatter cause pitting of the same outer surface and, after a period of time, the pitting becomes severe enough to also seriously impair the operator's vision thereby requiring replacement of such outer lense.

Accordingly, the invention herein disclosed and claimed is directed to the solution of the above as well as other problems associated with the welding helmets of the prior art.

SUMMARY OF THE INVENTION

According to the invention, a welding helmet or the like comprises a face shielding mask, first means for mounting said mask onto an operator's head, an opening formed through said mask, said opening being so formed as to be generally forwardly directed with respect to said mask, an electrically driven motor, a fan assembly operatively connected to said motor so as to be rotatably driven thereby, and second means carried generally within said opening and operatively connected to said mask for carrying said motor and fan assembly, said second means being effective for positioning said fan assembly in any of a plurality of altitudes with respect to said mask in order to enable said fan assembly to direct a stream of air in a selected direction corresponding to a selected one of said plurality of altitudes.

Accordingly, a general object of the invention is to provide, in combination with a welding helmet or the like, electrically driven fan means so mounted on the helmet as to enable the fan means to direct a flow of air to any selected position.

Another object of the invention is to provide a helmet and fan assembly as generally set forth above which is effective for drawing air in between the interior of the helmet and the operator's face in order to provide relatively fresh and cooling air to the operator.

Other more specific objects and advantages of the invention will become apparent when reference is made to the following detailed description considered in conjunction with the drawings.

DESCRIPTION OF THE DRAWINGS

In the drawings, wherein certain details may be omitted from one or more views for purposes of clarity:

FIG. 1 is a side elevational view, with portions thereof broken away and in cross-section, of a welding helmet assembly constructed in accordance with the teachings of this invention;

FIG. 2 is an end elevational view of the welding helmet of FIG. 1, taken generally in the direction of arrow A of FIG. 1, illustrating the interior or inner surfaces of the helmet assembly;

FIG. 3 is an enlarged view illustrating a fragmentary portion of the helmet assembly shown in FIG. 1;

FIG. 4 is a fragmentary cross-sectional view taken generally on the plane of line 4—4 of FIG. 2 and looking in the direction of the arrows;

FIG. 5 is a top plan view of the welding helmet shown in FIG. 1;

FIG. 6 is an enlarged end elevational view of certain of the elements of FIG. 1 taken generally in the direction of arrow B of FIG. 1;

FIG. 7 is a fragmentary side elevational view taken generally on the plane of line 7—7 of FIG. 6 and looking in the direction of the arrows;

FIG. 8 is an enlarged fragmentary end elevational view of the grill portion of the welding helmet of FIG 1 taken in a direction generally opposite to that of arrow B of FIG. 1;

FIG. 9 is a fragmentary cross-sectional view of a welding helmet assembly illustrating a second embodiment of the invention;

FIG. 10 is an enlarged view illustrating a fragmentary portion of the structure disclosed in FIG 9;

FIG. 11 is a view similar to FIG. 9 illustrating a third embodiment of the invention;

FIG. 12 is a cross-sectional view taken generally on the plane of line 12—12 of FIG. 11 and looking in the direction of the arrows;

FIG. 13 is a cross-sectional view taken generally on the plane of either line 13—13 or 13A—13A of FIG. 12 and looking in the direction of the arrows;

FIG. 14 is a fragmentary cross-sectional view taken generally on the plane of line 14—14 of FIG. 13 and looking in the direction of the arrows;

FIG. 15 is a view similar to FIGS. 9 and 11 illustrating a fourth embodiment of the invention;

FIG. 19 is a view similar to FIG. 16 illustrating another form of shield or deflector;

FIG. 20 is an end elevational view of the shield of FIG. 19 taken generally in the direction of arrow D of FIG. 19;

FIG. 21 is a top plan view of the shield of FIG. 19 taken generally on the plane of line 21—21 of FIG. 19 and looking in the direction of the arrows;

FIG. 24 is a view similar to FIG. 2 illustrating the invention provided with a particular switching structure for switching the circuit leading to the motor assembly;

FIG. 25 is an enlarged fragmentary cross-sectional view taken generally on the plane of line 25—25 of FIG. 24 and looking in the direction of the arrows;

FIG. 26 is an enlarged fragmentary view taken generally on the plane of line 26—26 of FIG. 24 and looking in the direction of the arrows;

FIG. 27 is a fragmentary top plan view taken generally on the plane of line 27—27 of FIG. 25;

DESCRIPTION OF THE PREFERRED EMBODIMENTS

Figure 16:
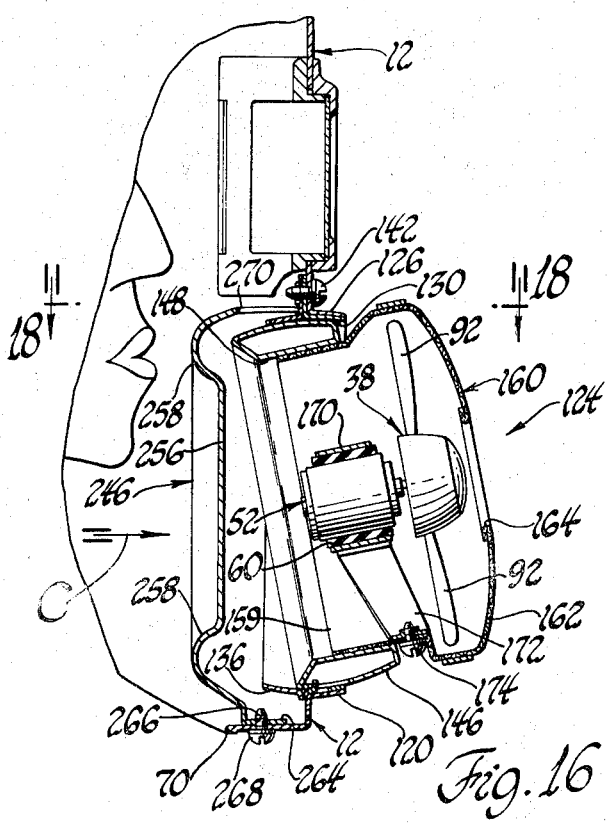
FIG. 16 is a view similar to FIG. 9 illustrating another embodiment of a shield or deflector plate employable in combination with the fan and motor assembly of the invention.

Referring now in greater detail to the drawings, FIGS. 1 and 2 illustrate a helmet assembly 10, constructed in accordance with the teachings of this invention, as comprising a face-shielding mask 12 provided with a laterally disposed head-engaging band 14 and an upper head-engaging band 16. Bands 14 and 16 may be of unitary construction, at their common junctures, and may be further provided, as is common practice, with suitable adjustment devices, as typically shown at 18, for adjusting the lengths of the respective bands in order to conform to the size of the welding operator's head 20. Band 16, of course, would pass over the top of the operator's head while band 14 would be situated generally about the operator's head so as to engage the back, sides and forehead of the operator's head. The entire head band assembly is, in turn, pivotally engaged at opposite sides as by suitable pivot shafts 22 and 24 having portions extending through the wall portion of mask 12 and retained therethrough for pivotal rotation with respect thereto as by suitable retainers or fasteners 26 and 28. Such arrangements are well known in the art and accordingly it is not deemed necessary to show all of the precise details of such a pivotal mounting assembly for bands 14 and 16.

Further, mask 12 is also provided with a suitable shielding-type window assembly 30 through which the operator may observe the welding operation being performed. The window assembly 30, which may be of any one of a number of such assemblies well known in the art, is illustrated as being comprised of an inner frame member 32 and an outer frame member 34 between which, if desired, may be secured a suitable shielding lense. As is also well known in the art, the outer frame 34 may be hingedly mounted and carry a separate darkly tinted lense which can be at times swung away as to permit the operator to observe the work without having to swingably raise the helmet assembly 10.

The lower frontal area of mask 12 is provided with a general housing portion 36 for containing an electrically driven fan 38. As seen in each of FIGS. 1, 2, and 5, the housing portion 36 is comprised generally of a forwardly projecting portion 40 provided with an integrally formed protective shield or grill 42 which has a centrally disposed opening 44 formed therethrough and a plurality of sector-like openings 46 arranged generally circumferentially about central opening 44. At the upper end, the housing portion 36 is provided with an inwardly directed eye-lid like flange portion 48 which functions as a fan shroud when the fan 38 is inclined in the position illustrated in FIG. 1.

As best shown in FIG. 1, 6 and 7, an air deflector and radiation shield 50 is provided by which an electric motor assembly 52, carrying the fan on its output shaft 54, is pivotally mounted to the helmet mask 12. The shield 50 is formed to have a generally circular periphery 56 and a centrally disposed tubular portion 58 which receives a sleeve-like mounting bushing 60 which may be made of resilient material such as rubber so as to permit the press fit therein of said motor 52. A generally flat body portion 62 joins with and extends radially outwardly of the tubular portion 58 and joins an arcuately formed portion 64 terminating in the circular periphery 56. The lower portion of shield 50 may be cut away as at 66 and 68 in order to provide adequate clearance for the lower inwardly directed wall portion 70 of the mask 12. As can be seen by FIGS. 1, 3 and 6, the shield 50 is so cut away as to form a projecting tongue-like tab or arm 72 carrying with it a threaded fastener member 74.

As illustrated in FIGS. 1, 4, 6 and 7, the shield 50 is provided with oppositely disposed pivot support arms 76 and 78 which are respectively pivotally connected to mask 12 as by pivot pins 80 and 82. In order to accommodate arms 76 and 78, the projection 40 is preferably provided with oppositely disposed flatted surfaces 84 and 86 formed internally of the mask 12. FIG. 2 illustrates such mounting surfaces 84 and 86 while FIG. 4 typically illustrates the pivotal mounting of the shield arms to the mask 12.

Accordingly, it can be seen that the deflector shield 50, motor 52 and fan 38 carried thereby can be pivotally rotated about pivots 80 and 82 by merely loosening the nut member 88 and sliding the fastener 74 along the clearance slot 90 formed in lower helmet wall portion 70. The shield 50, and structure carried thereby, can then be secured in a selected position by merely re-tightening the nut 88 so as to frictionally hold the shield tongue or tab 72 in such a selected position. Such extreme positions of adjustment are illustrated, for example, by the fan blades at 92 and 92a.

A pair of terminals 94 and 96 on motor assembly 52 are respectively connected to electrical conductors 98 and 100 which, through suitable circuitry to be described, are electrically connected to a source of electrical energy which, as illustrated, is comprised of electrical batteries 102 and 104. As can best be seen in FIGS. 1, 2 and 5, the helmet mask 12 is provided with pocket-like chambers 106 and 108 formed at opposite sides and at the upper portion of the mask 12. End walls 110 and 112 in chambers 106 and 108 respectively carry electrical terminals 114, 116 and 118, 120 for engaging the polar terminals of the batteries 102 and 104. Of course, as will be shown in schematic wiring diagrams to be discussed, each of the electrical terminals 114, 116 and 118, 120 are electrically connected to suitable electrical conductors eventually leading to terminals and conductors 98, 100. As can be seen in FIGS. 1 and 2, the chambers 106 and 108 are so located as to situate the batteries 102 and 104 substantially above the axis of pivot shafts 22, 24 in order to thereby provide a substantial counterbalancing weight for the fan assembly when the operator raises the mask 12 upwardly (counter-clockwise about pivot shafts 22, 24 as viewed in FIG. 1).

In view of the preceding, it should be apparent that the operator may, even while wearing the helmet of the invention, adjust the position of the fan and motor assembly relative to the mask 12 in order to accurately direct a stream of air at the work in order to thereby continually flow the welding fumes away from the work thereby enabling the operator to have clear vision of the weld in process. It should also be apparent that while the fan is blowing a stream of air to exhaust through the grill 42 the fan is also creating an intake type of fresh air flow generally about the operator's head as indicated by the arrows 122. It will be noted that the fresh air thusly drawn in passes or sweeps past the operator's eyes, nose and mouth and thereby greatly reduces the contaminates which the operator would otherwise be exposed to with welding helmets of the prior art.

FIGS. 9 through 31, illustrate further embodiments and modifications of the invention as shown in FIGS. 1–8. All elements in such figures which are like or similar to the elements of FIGS. 1–8 are identified with like reference numbers. Further, since the various embodiments and modifications are primarily concerned with the exhausting fan arrangement, only such fragmentary portions of the mask 12 are shown as are necessary in order to illustrate the relationship thereto.

Referring now in greater detail to FIGS. 9 and 10, the pivotally situated fan assembly 124 is illustrated as being comprised of an outwardly projecting portion 126 (which is shown as being formed integrally with the wall portion of mask 12) which, when viewed from either end is substantially circular but which, in axial cross-section, has an inner surface 128 of generally spherical configuration. A first bearing or journal member, having an annular projecting portion 130 with inner and outer surfaces closely conforming to inner surface 128, is provided with a radially extending flange 134 adapted to abut, when assembled, against the inner surface of the mask 12. A second journal member 132, having an annular projecting portion 136 with the inner surface 138 thereof forming a continuation of the general surface configuartion defined by the inner surface of first journal projection 130, is also provided with a radially extending flange 140. Journal 132 is so situated as to be within mask 12 and have its flange 140 containing the flange 134 between itself and the wall of mask 12. Both journal members may be retained in assembled relationship to the wall of mask 12 as by a plurality of screws passing through mask 12, flange 134 and threadedly engaged with flange 140 of journal member 132 as typically illustrated at 142.

An annular bearing member 144, contained within the journal members, has an outer spherical surface 146 (conforming to the inner surfaces of journal projections 130, 136) and a generally cylindrical inner surface 148 operatively joined to each other as by axially spaced radially extending wall portions 150, 152. As is apparent, the contained annular bearing 144 and coacting journal members can be considered as forming a ball and socket arrangement by which the bearing 144 can be rotationally and angularly positioned or adjusted relative to the first and second journal members as well as the mask 12. However, for purposes of safety, it is preferred that some means be provided for limiting the degree of relative adjustment between the bearing member 144 and coacting journal members. This may be accomplished, as best illustrated in FIG. 10, by providing a slot or cut-out portion 154 in the spherical surface 146 of bearing 144 and to form an upstanding finger or tab 156, struck from the journal projection 130, received within such slot. In such an arrangement, the length and width of the cut-out 154 would, of course, determine the maximum relative position of bearing member 144.

The inner surface 148 of bearing member 144 has secured thereto, as by welding or any other suitable fastening means, a cylindrical portion 158 of a fan guard or grill member 160 having a somewhat enlarged and covered-over outer end 162. Preferably, grill 160 is formed of relatively heavy gauge screening material and is provided with a generally centrally disposed aperture 164. Further, a shroud 166 may be suitably carried by the outer surface of grill 160 in order to enhance the operational characteristics of the fan blades 92. The axial length of the shroud may be varied in order to accommodate the pivoting requirements of the fan assembly as well as provide a confined flow path for the air being propelled by the fan blades.

A funnel-like deflector plate or shield 168 has, at its smaller end, a cylindrical extension 170 which tightly receives therein the relatively resilient motor mounting sleeve 60. Further, cylindrical extension 170 has secured thereto, as by welding, a plurality (preferably three) of supporting or mounting struts one of which is illustrated at 172. The other ends of the respective struts are secured to the grill 160 or bearing 144 as by a threadedly engaged screw typically shown at 174. The supporting struts are arranged as to be generally radially extending with respect to shield extension 170 and angularly spaced thereabout in a manner as generally illustrated in FIG. 12, which relates to another embodiment of the invention.

The other end of the shield 168 is provided with a generally arcuately formed flange-like portion 176 terminating so as to be directed generally toward the forward portion of the mask 12.

It should, of course, be apparent that the various elements comprising the ball and socket arrangement of FIG. 9 are of such proportions as to cause sufficient frictional engagement therebetween in order to enable the deflector and fan assembly 124 to remain in any selected position. The air flow is like that described with reference to FIG. 1 and it should be clear that such air flow must pass around the arcuate flange portion 176 of deflector plate 158 and then through the channel defined generally by the inner surface 148 of bearing assembly 144.

FIGS. 11, 12, 13 and 14 illustrate gimbal type shield and fan assembly or arrangement 178.. In FIGS. 11, 12, 13 and 14, all elements which are like or similar to those of the preceding figures are identified with like reference numbers. As shown in both FIGS. 11, and 12, the forward lower wall portion of mask 12 has a generally circular opening 180 formed therethrough which somewhat closely receives therein an annular or ring-like support 182. As best illustrated in FIG. 11, the support 182 has an axially determined cross-sectional configuration of a slice or a band taken from a hollow sphere so as to preferably have inner and outer surfaces 184 and 186 of a spherical contour. As shown in FIG. 12, the outer ring support 182 has diametrically opposed upper and lower pivot assemblies 188 and 190. Each of such pivot assemblies 188 and 190 is comprised of elements arranged generally as shown by both FIGS. 13 and 14. For example, each of the pivot assemblies is comprised of inner and outer clamping plates 192 and 194 which are respectively disposed against the inner and outer surfaces of the frontal wall of mask 12. A pair of screws 196 and 198 serve to securely fix the clamping plates to the mask wall portion.

The plates 192 and 194 are so located as to have their respective cylindrical-like surfaces 200 and 202 juxtaposed and situated so as to be in general alignment with a generally vertically extending clearance slot 204 formed in the wall of mask 12. The cylindrical surfaces 200 and 202 combine to form a vertically extending journal for receiving a pivot pin 206 therein. Each of the pivot pins 206 is secured at its one end, as by a peened-over portion 208, to the outer band or annular support 182. The pivot pins 206 in each of the assemblies 188 and 190 combine to define a common vertical axis of pivotal rotation for outer band or annular support 182 and all related elements carried thereby.

A second inner annular support ring 210, of a configuration similar to outer support ring 182 but of a smaller overall diameter is received within outer support ring 182 and pivotally secured thereto as by diametrically opposed pivot post members 212 and 214 which cooperate to define a secondary axis of rotation generally normal to the axis of pivot pins 206. As can be seen in both FIGURES 11 and 12, each of the pivot post members 212 and 214 is comprised of a cylindrical pivot portion 216 and a threaded shank portion 218, of reduced diameter, effective for threadably engaging suitable apertures 220 formed in the outer support ring as by a piercing and forming operation carried out thereon. When such pivot posts are threadably anchored to outer support ring 182, the inner support ring 210 is made capable of rotation relative thereto.

A grill 160, substantially similar to the grill 160 of FIG. 9, is carried by its generally tubular portion 158 which is secured to the inner annular surface of inner support ring 210 by any suitable means such as welding. Although not specifically shown, a fan shroud, such as annular shroud 166 of FIG. 9, may be provided about grill 160 in order to enhance the pumping characteristics of fan 38. Preferably, grill 160 is formed of relatively heavy gauge screening and provided with spaced inwardly directed dimple-like portions 222 for securing thereto, as by screws 174, the radially outermost ends of the spaced struts 172.

As should be apparent in view of the preceding, the gimbal arrangement enables the complete freedom in positioning the shield and fan assembly 178 in any desired attitude with respect to the mask 12 and that therefore the air stream created by fan 38 can be directed against the work regardless of whatever position the operator must assume relative to such work.

FIG. 15 illustrates another embodiment of the invention; all elements of FIG. 15 which are like or similar to those of the preceding Figures are identified with like reference numbers. The swivel mounted shield and fan assembly 224 of FIG. 15 is illustrated as being comprised of an inner cylindrical conduit portion 226 provided with a radially directed flange portion 228 by which it is mounted against the inner surface of the frontal wall portion of mask 12 so as to be disposed generally in line with a circular aperture 180 formed through the mask.

A second generally tubular member 230, also provided with a radially directed flange portion 232, is mounted against the external surface of mask 12 so as to also be in alignment with aperture 180. Tubular or cylindrical sections 226 and 230 may be secured to mask 12 and each other as by a plurality of screws passing therethrough as typically illustrated at 234.

As illustrated, the second tubular member 230 is provided with a raised or convex surface 236 formed circumferentially thereabout in order to function as both axial retainer and a circumferential guide bead for a relatively short tubular joint member 238 which has a complementary concave surface 240 formed at one end and extending circumferentially thereabout. As shown the convex surface 236 is circumferentially slidably received within the concave surface 240 thereby enabling the tubular joint member 238 to be angularly rotated with respect to tubular member 230 while still maintaining its centerline in alignment with the centerline 242 of member 230.

As will be noted, however, the plurality of supporting struts (one of which is illustrated at 172) maintain the deflector plate or shield 158, motor 52 and fan member 38 at an angle or generally inclined with respect to the centerline 242. A grill 244, provided with a central disposed aperture 164, preferably formed of relatively heavy wire mesh or screening, is generally tubular; however, the leftmost end 246 of it is cut in a somewhat truncated manner and slipped over the extending portion of joint member 238 so as to assume a position whereat the axis thereof is generally colinear with the axis 243 of deflector shield 158, motor 52 and fan 38. If desired, grill 244 may be affixed to the joint member 238 by means of the plurality of screws, one of which is shown at 174, which function to secure the radially outer ends of struts 172 to the tubular joint member 238.

In view of the preceding, it should be apparent that the grill 244, motor 52, fan 38, shield 158 and tubular joint 238 may be rotated, as an assembly, about the bead surface 236 on tubular mounting member 230 in order to achieve desired angularity thereof with respect to the mask 12. Such rotation will, of course, occur while maintaining the angle between centerlines 243 and 242 substantially constant. Again, if desired, a fan shroud similar to shroud 166 of FIG. 9, may be provided on the grill 244.

In addition to the various deflector plates or shields illustrated in the preceding embodiments, FIGS. 16–21 illustrate further selected configurations of shields which may be employed in combination with the adjustable fan assemblies. For purposes of example, the shields of FIGS. 16–21 are illustrated in combination with the ball and socket fan arrangement of FIG. 9. It should be noted, however, as will become apparent, that the shields of FIG. 16–21 are not limited in their use to merely being employed in combination with the fan assembly of FIG. 9 but may be equally well employed in combination with the other fan assembly embodiments. The basic difference being, of course, that the shields of FIGS. 1–15 are movable with the associated adjustable fan assemblies while the shields of FIGS. 16–21 are stationary.

Figure 18:
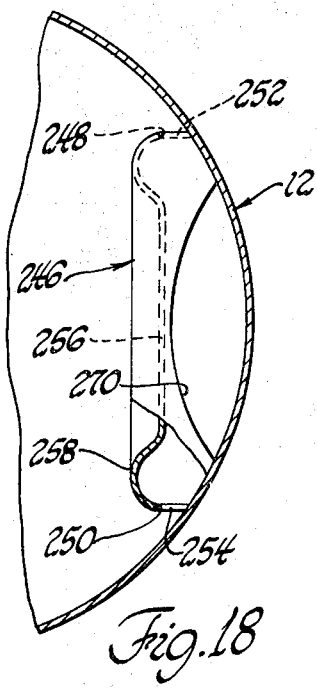
FIG. 18 is a top plan view, with portions thereof broken away and in cross-section, taken generally on the plane of line 18—18 of FIG. 16 and looking in the direction of the arrows.
Figure 17:
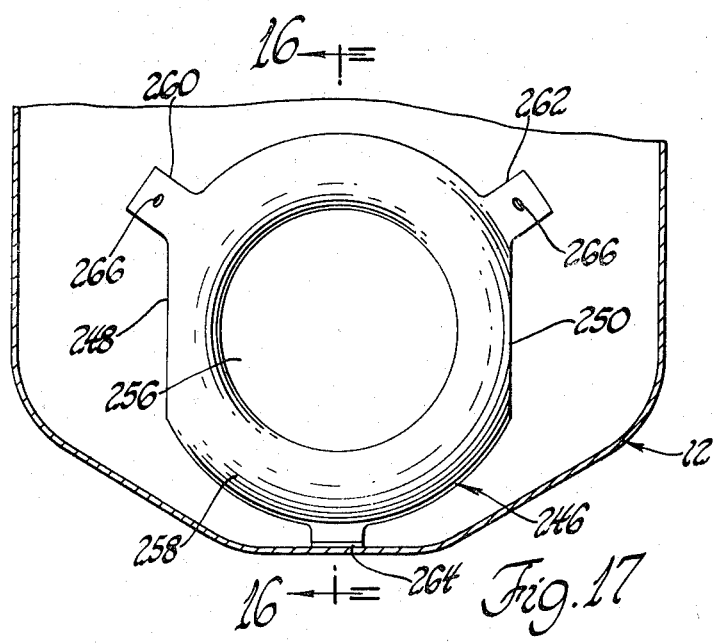
FIG. 17 is an end elevational view of the shield of FIG. 16 taken generally in the direction of arrow C of FIG 16.

Referring now in greater detail to FIGS. 16–21, it can be seen that FIGS. 16, 17 and 18 illustrate a first form of stationary shield 246 which, as viewed in FIG. 17, is generally circular having sides cut away as at 248 and 250 in order to thereby provide openings or passages 252 and 254 between the interior wall surface of mask 12 and the edges of the shield as best seen in FIG. 18. Further, as is seen in each of FIGS. 16, 17 and 18, shield 246 has a generally centrally disposed circular dished body portion 256 the edges of which carry a peripherally extending flange-like portion 258 of arcuate axial cross-section.

As seen in FIGS. 16 and 17, shield 246 is provided with a plurality of mounting tabs 260, 262 and 264, each provided with an aperture 266, which is threadedly engageable with a securing screw a typically illustrated at 268.

As shown in FIG. 16, the mounting screws pass through the wall of mask 12 and threadedly secure the tabs of shield 246 against the inner wall surface of the mask 12.

As shown in both FIGS. 16 and 18, the upper portion of shield 246 has an arcuate opening 270 formed therein to provide a passage for fresh air flow in the same way as do the side passages 252 and 254.

Referring now in greater detail FIGS. 19, 20 and 21 illustrate another embodiment of a shield 272 used, for example, in combination with the ball-joint-like fan assembly 124. The shield assembly 272 may be comprised of a first cup-like member 274 of circular configuration provided with a plurality of integrally formed mounting tabs 276, 278 and 280. The end face 282 of member 274 is provided with a plurality of vertically extending laterally spaced slots or openings 284.

A second cup-like shielding member 286, which may be secured as by spot welding an integrally formed flange 288 to the end face 282, is also provided with a second plurality of vertically extending and laterally spaced slots or openings 290 which are so positioned as to be situated between slots 284 and not in alignment therewith. Such a staggered relationship of slots permits the passage of air therethrough while at the same time protecting against the straight path of any radiation or flying particles including weld spatter. Since the slots 290 and 284 provide for sufficient air flow, the upper portion 292 of the first shield plate 274 may have its forwardmost end surface 294 contoured as to be held against the inner wall surface of mask 12.

Figure 22:
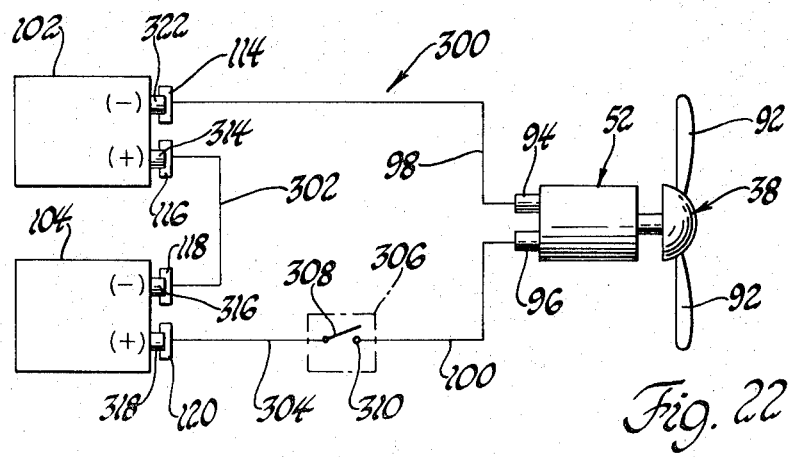
FIG. 22 is a schematic wiring diagram of electrical circuitry employable by the invention.

FIG. 22 illustrates an electrical circuit 300, suitable for supplying electrical energy to the electrical motor 52, as comprising batteries 102 and 104 connected to the electrical contacts 114, 116 and 118, 120 (also see FIGS. 1 and 2). The batteries 102 and 104 are shown as being in series circuit with each other and therefore contacts 116 and 118 are electrically connected to each other by an electrical conductor 302. Contact 114 is electrically connected to terminal 94 of motor 52 by conductor means 98 while contact 120 is electrically connected to terminal 96 by conductor means 100 and 304 which are, in turn, respectively serially connected to a switching means or assembly 306. As diagrammatically illustrated, switch assembly 306 is basically comprised of a normally open switch member 308 which at times is closed against a cooperating contact 310 in order to complete the circuit through conductors 304 and 100. Switch assembly 306 may take any number of specific forms two of which will subsequently be considered in detail. Obviously, whenever switch member 308 is closed the circuit from the source of electrical energy (batteries 102 and 104) to the motor 52 is closed thereby causing the motor 52 to drive the fan assembly 38.

Figure 23:
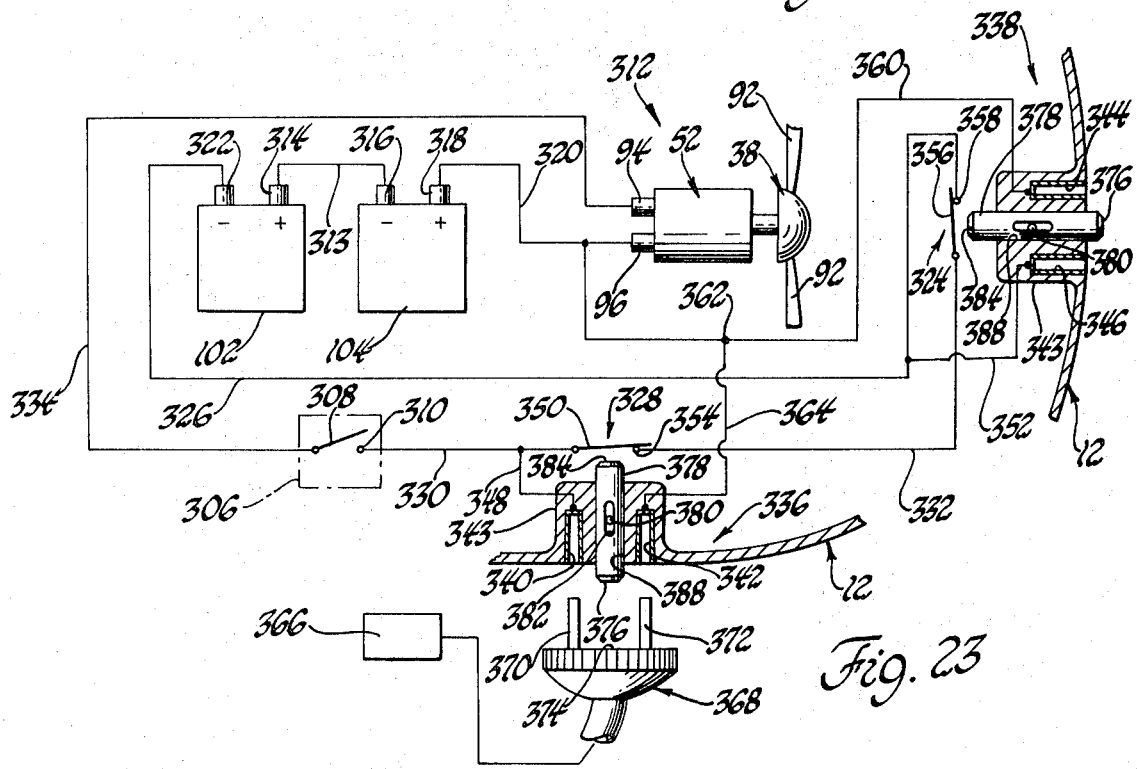
FIG. 23 is a schematic wiring diagram of further electrical circuitry employable by the invention.

FIG. 23 illustrates another embodiment of electrical circuitry employable by the invention. In FIG. 23, the electrical circuitry 312 is illustrated as being comprised of a first electrical conductor 313 interconnecting terminals 314 and 316 of batteries 102 and 104 in series as in FIG. 22. Terminal 318 of battery 104 is electrically connected to terminal 96 of motor 52 as by a conductor 320 while terminal 322 of battery 102 is electrically connected to one side of a normally closed auxiliary switch assembly 324 by means of a conductor 326.

A second normally closed auxiliary switch assembly 328 is connected at one side to contact 310 of switch assembly 306, as by means of conductor 330, and connected at its other side to the first auxiliary switch assembly 324 as by means of conductor 332. The other side of switch assembly 306 is electrically connected to terminal 94 of motor assembly 52 as by a conductor 334.

In view of the above, it can be seen that the circuitry of FIG. 23 thus far described is functionally equivalent to the circuit of FIG. 22. For example, in FIG. 22, closure of switch member 308 causes a circuit to be completed through battery 104, conductors 304, 100, terminal 96, motor 52, terminal 94, conductor 98, battery 102, conductor 302 and back to battery 104. Similarly, in FIG. 23, closure of switch member 308 completes the circuit described by battery 104, conductor 320, terminal 96, motor 52, terminal 94, conductor 334, switch assembly 306, conductor 330, switch assembly 328, conductor 332, switch assembly 324, conductor 326, battery 102, conductor 313 and back to battery 104. As will be shown, switch assembly 306 may, of course, be a manually actuated switch which is opened and closed by the operator wearing the protective headgear.

The circuitry of FIG. 23, however, contemplates a further modification of the mask 12 as, for example, by the provision of integrally formed electrical socket assemblies 336 and 338 respectively provided on the side and forward portions of the mask 12. As is well known in the art, socket assembly 336 is provided with female type electrical contacts 340 and 342 (electrically insulated from or within the surrounding structure 343) while socket assembly 338 is similarly provided with female type electrical contacts 344 and 346.

As illustrated, contact 340 is electrically connected as by a conductor 348 to conductor 330 at a point generally between contact 310 and one end of the movable switch member 350 of auxiliary switch assembly 328. Similarly, socket assembly 338 has its contact 346 connected, as by a conductor 352, to conductor 326 at a point generally between contact 358 of auxiliary switch assembly 324 and terminal 322 of battery 102. Fixed contact 358, of auxiliary switch assembly 324 is, of course, connected to conductor 326.

Female contact 344 of socket assembly 338 is connected, as by a conductor 360, to terminal 96 of motor 52 through conductor 320 while female contact 342 of socket assembly 336 is similarly electrically connected to terminal 96 by virtue of its connection to conductor 360, as at 362, by a conductor 364. As will be seen, the provision of such socket assemblies enables both the operation of motor 52 as well as the charging of batteries 102 and 104 with an externally located remotely situated source of electrical energy 366.

As illustrated in FIG. 23, the source of electrical energy 366 (preferably regulated) has electrically connected thereto a plug assembly 368 provided with male type or prong contacts 370 and 372, which are adapted to be engageable with the female contacts 340 and 342 of socket assembly 336 or contacts 346 and 344 of socket assembly 338.

Assuming now that switch assembly 306 is closed, it can be seen that when prongs or male contacts 370 and 372 are inserted into socket contacts 340 and 342 that body or housing 374 of plug assembly 368 will abut against end 376 of a plunger-like member 378 slidably retained within the structure 343 of socket assembly 336. Plunger 378 may have limited axial motion determined as by a stationary pin 380 passing through an axially elongated slot 382 formed in plunger 378. As plug 368 is fully engaged in socket 336, plunger 378 is moved upwardly (as viewed in FIG. 23) causing end 384 thereof to contact and move switch member 350 upwardly away from cooperating stationary contact 354.

At this time, the nature of the motor energizing circuit is changed from one employing batteries 102 and 104 as the source of electrical energy to one employing the external source of electrical energy 366 for powering motor 52. That is, it can be seen that at this time because of auxiliary switch member 350 being opened, the circuit leading from battery terminal 322 to terminal 94 of motor 52 is opened. However, a new circuit is completed which is described generally by source 366, male contact 372, female contact 342, conductor 364, conductor 360 to conductor 320, terminal 96, motor 52, terminal 94, conductor 334, switch assembly 306, conductor 330 to conductor 348, female contact 340, male contact 370, and back to source 366.

An arrangement as disclosed, of course, provides the added feature of being able to operate the motor 52 as by employing an external source provided in the manufacturing area in order to overcome such instances where, for some reason, the energy level of batteries 102 and 104 has become too low to sufficiently drive the motor and fan assembly 38. The switch member 350 may be suitably resiliently biased toward the normally closed condition thereby insuring the closure of switch member 350 whenever plug assembly 368 was withdrawn from socket assembly 336 thereby reverting the source of electrical power to be that of batteries 102 and 104, if, of course, switch member 308 was closed.

As illustrated, socket assembly 338 is also provided with a plunger 378 like that of socket assembly 336. Accordingly, if plug assembly 368 is inserted into socket assembly 338, plunger 378 thereof will similarly open switch member 356 of auxiliary switch assembly 324 to define an electrical circuit different from the two previously described. That is, assuming that switch member 308 is closed, a circuit would be defined by source 366, male terminal 372, female contact 344, conductor 360 to conductor 320, terminal 318 of battery 104, battery 104, terminal 316, conductor 313, terminal 314, battery 102, terminal 322, conductor 326 to conductor 352, conductor 352, female contact 346, male contact 370 and back to external source 366. The preceding circuit, of course, describes a charging circuit by which batteries 102 and 104 may be re-charged during such time as when the helmet is not in use. It is contemplated that when the operator removes the helmet assembly 10 at the end of his work shift, the operator would hang the helmet on a stationary plug assembly as possibly one protruding from a wall and leave the helmet there for battery charging until the operator's return for his next work shift. This would result in the batteries 102 and 104 being always charged to their maximum capacity at the start of a work shift.

FIG. 23 has illustrated the helmet mask 12 as carrying the plungers 378; however, it should be made clear that the plungers 378 need not be so carried by the helmet and may instead be removed so as to provide through open passageways 388 and that the plug assembly 368 may include, as an integral part thereof, an extending rod-like portion of sufficient length so as to be inserted through such passageways 388, whenever the plug is engaged with a socket assembly, in order to open the respective switch members 350 and 356 in a manner as achieved by plungers 378.

FIG. 24, among other things, illustrates a switching assembly 400, situated on rotatable shaft 24, which may be employed as the switching device or assembly 306 of either FIG. 22 or 23. FIG. 25, a view taken generally on the plane of line 25—25 of FIG. 24, illustrates the switching assembly 400 in enlarged scale.

Referring now in greater detail to FIG. 25 (and related FIGS. 26 and 27) it can be seen that the switch assembly 400 is comprised of a clamp-like body 402 provided with split tab portions 404, 406 which are drawn together as by a screw 408 in order to thereby mount the body 402 onto the shaft 24 which is relatively rotatable to the helmet mask 12. It should be made clear that screw 408 is tightened on sufficiently to mount the body 402 relatively loosely onto the shaft 24 and not to frictionally clamp the body 402 and shaft 24 together. The reason for this will become apparent as the discussion progresses. The shaft journal portion 13 is, of course, suitably secured to the mask 12. The lower end of body 402 is provided with a housing portion generally defined by arcuate arm portions 410, 412 which serve to generally contain therebetween a glass vial or container 414 which, in turn, contains a small amount of mercury.

As best seen in FIG. 26 the glass container 414 is provided with four arm or chamber sections 416, 418, 420 and 422 arranged in a generally lateral plane and at ninety degrees with respect to each other. A fifth arm or chamber section 424, as shown in each of FIGS. 25 and 26, depends downwardly and generally perpendicularly to the other four chambers. Chamber section 424 also contains a pair of electrode-like terminals 426 and 428 projecting inwardly thereof so as to be at times covered by the liquid mercury 430.

As shown in both FIGS. 25 and 27, body 402 is provided with a somewhat eccentrically disposed support portion 432 which, in turn, carries a generally laterally extending locking arm or pin 434 of a length sufficient to project through and beyond an arcuate slot 436 formed in the wall of mask 12. An annular groove formed in rod or pin 434 is adapted to receive a snap-ring-like flange member 438 of a diameter larger than the width of slot 436. Further, the free end of pin 434 is threaded so as to be threadedly engageable with a winged nut 440 situated externally of the mask 12.

In view of the above it should be apparent that switch body 402 can be adjustably rotated about shaft 24 and pin 434 locked in a selected position within slot 436 as by tightening the winged lock nut 440 causing the wall of mask 12 to be tightly frictionally engaged therebetween. Accordingly, it can be seen that when the operator lowers the mask into a welding position that the mercury 430 flows into chamber 424 closing the electrical circuit between electrodes 426 and 428. However, if the mask 12 is raised, as for the inspection of a weld, switch body 402 is rotated counter-clockwise (as viewed in FIG. 25) causing the liquid mercury 430 to run into chamber 418 and thereby open the circuit between electrodes 426 and 428 thereby stopping the action of the motor 52.

Likewise, if the helmet is taken off and laid on either the front or forward portion thereof or on either its left or right sides, the liquid mercury 430 would run out of chamber 424 and into chamber 422, 416 or 420, respectively and in either instance again open the circuit to the electric motor causing de-energization thereof. The position of switch body 402 relative to mask 12 may, of course, be adjusted by the operator in order to accommodate the particular angle at which the operator must hold his head during a particular welding operation; such adjustment being accomplished by virtue of pin 434, locking nut 440 and the intermediately located wall of mask 12.

Figure 28:
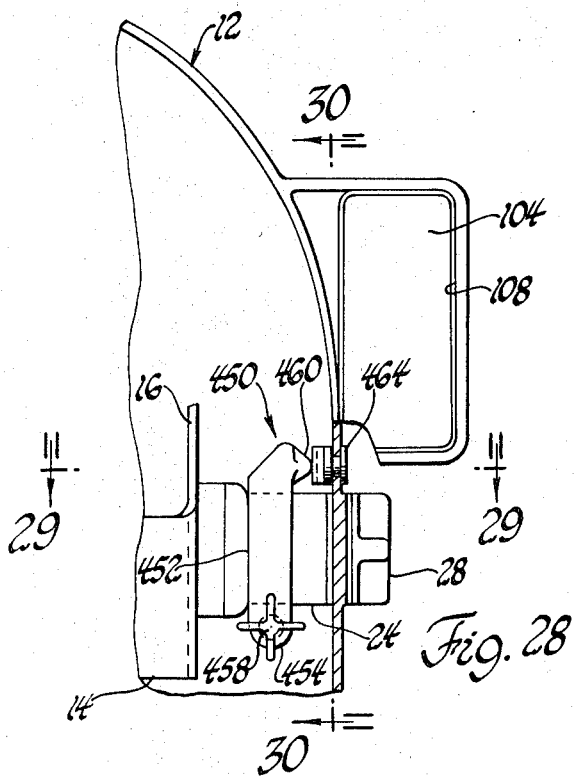
FIG. 28 is a fragmentary view similar to that of FIG. 24 illustrating a second type of switching assembly for switching the circuit leading to the motor assembly.
Figure 29:
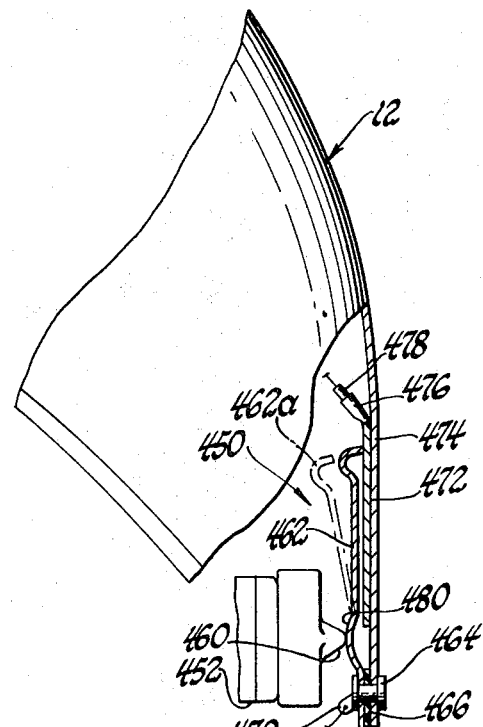
FIG. 29 is a fragmentary cross-sectional view taken generally on the plane of line 29—29 of FIG. 28 and looking in the direction of the arrows.
Figure 30:
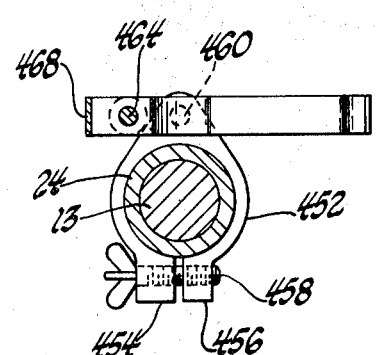
FIG. 30 is a fragmentary cross-sectional view taken generally on the plane of line 30—30 of FIG. 28 and looking in the direction of the arrows.

FIGS. 28, 29 and 30 illustrate a second form of switching assembly 450 employable as the switch assembly 306 of either FIG. 22 or 23. For example, referring in greater detail to FIGS. 28, 29 and 30 it can be seen that the switch assembly 450 comprises a clamp-like body 452 secured about the rotatable shaft 24 as by split tab portions 454, 456 which are urged toward each other by a wing-type screw 458 in order to securely situate the body 452 onto shaft 24 for rotation therewith. Projecting from the side of body 452 is an integrally formed cam portion 460 adapted to at times engage and move a generally resilient type electrical contact 462, connected at one end as by a rivet 464 to the side wall portion of the helmet mask 12. If desired, an insulating portion 466 may be provided between end 468 of contact 462 and helmet mask 12. As somewhat diagrammatically illustrated, contact 462 may be provided with a terminal at 470 which may be electrically connected as to conductor 304 of FIG. 22 or conductor 334 of FIG. 23.

As best shown in FIG. 29, a second stationary contact 472 is suitably secured to the interior wall surface of mask 12 and so positioned as to be engageable by the leaf type contact 462 when the cam portion 460 is in the position illustrated. The end 474 of contact may be provided with a socket type terminal 476 adapted to receive a plug type terminal 478 which is electrically connected as to either conductor 100 of FIG. 22 or conductor 330 of FIG. 23.

In view of the above, it should be apparent that whenever the mask portion 12 is rotated relative to the head band 14 and shaft 24 to, for example, a position suitable for welding that cam portion 460 will engage contact 462, as at the rise 480 formed thereon, and resiliently force contact 462 from its free open position 462a to a closed position against fixed contact 472 thereby closing the circuit to energize the motor 52 as disclosed in either FIG. 22 or 23. When the mask is raised by the operator, for such purposes as examining the weld, cam 460 and contact 462 will be rotated out of the position shown in FIG. 29 thereby permitting contact 462 to move to position 462a thereby opening the circuit to the motor 52.

As generally diagrammatically illustrated in FIG. 24, it is contemplated that the circuits of either FIG. 22 or FIG. 23 can, for the most part, be provided along the interior surface of the mask 12 in a printed circuit form. As shown, conductor portion 480, internally of the helmet and joining contacts 116, 118 of respective batteries 102, 104, would serve the function of conductor 302 of FIG. 22 or conductor 313 of FIG. 23, while conductor 482 would serve the function of conductor 98 of FIG. 22 or conductor 326 of FIG. 23. Similarly, conductor 484 could serve the function of either conductor 304 of FIG. 22 or conductor 320 of FIG. 23. The preceding is not intended to imply that the practice of the invention is limited to the employment of such printed circuits since it should be apparent that various forms of wiring harnesses could be employed and carried by the mask 12 in order to accomplish the required circuitry.

Further, as also shown in FIG. 24, it is preferred that terminal block assemblies 486 and 488 be employed and carried by the wall of mask 12, internally thereof. The general circuitry would be electrically connected to female or socket type electrical contacts 490 and 492 of terminal block 486 as well as socket type contacts 494 and 496 of terminal block 488.

Such terminal block assemblies are particularly useful especially where it is desired to be able to quickly connect in circuit the switch assembly 400 or the motor assembly 52. For example, a pair of conductor portions 498, 500 leading from terminals 94, 96 of motor assembly may be provided with male type or plug electrical connectors 502, 504 which can be quickly connected to the socket connectors 494 and 496.

Similarly, conductor portions 506 and 508 leading from terminals or electrodes 426 and 428 of switch assembly 400 may be provided with male type or plug electrical connectors 510 and 512 for respective reception by socket connectors 490 and 492 of terminal block assembly 486.

Figure 31:
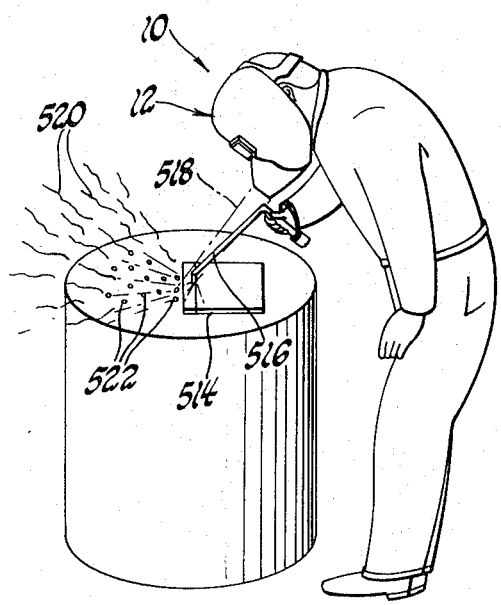
FIG. 31 is a view representing a welding operator employing a welding mask constructed in accordance with the teachings of the invention and the observed pattern of flow of smoke and fumes as well as weld spatter.

FIG. 31 pictorially illustrates the results observed during certain tests conducted with helmets constructed in accordance with the invention. In FIG. 31, it can be seen that an operator provided with the helmet 10 is welding a workpiece 514 with an electrode 516 and that the stream of air 518 emitted from the helmet 10 causes the smoke 520 and spatter or sparks 522, generated by the welding operation, to be blown away from the operator thereby assuring the operator of relatively clean air and clear vision for observing the quality of the weld bead.

The invention has been primarily shown as applied to a welding helmet. However, it should be apparent that the teachings of the invention can be equally well applied to suitable protective head gear used in other industries which do have a similarity of problems. For example, such other industries could include those involved in abrasive grinding, painting, certain plating operations and even cleaning as by sand blasting.

The invention as herein disclosed provides an apparatus which enables the operator to wear the protective head gear for sustained periods significantly longer than with head gear of the prior art and while so doing be in greater comfort because of the flow of air about his head and face which further insures the operator of fresher breathing air. Not the least of the benefits is the fact that all smoke and dust or other flying particles generated during the work operation is effectively driven away from both the workpiece and the operator thereby providing the operator with clear and unimpaired vision.

Although only a selected number of embodiments of the invention have been disclosed and described, it should be apparent that other embodiments and modifications of the invention are possible.

I claim:

1. A welding helmet or the like, comprising a face shielding mask, first means for mounting said mask onto an operator's head, an opening formed through said mask, said opening being so formed as to be generally forwardly directed with respect to said mask, an electrically driven motor, a fan assembly operatively connected to said motor so as to be rotatably driven thereby, and second means carried generally within said opening and operatively connected to said mask for carrying said motor and fan assembly, said second means being effective for positioning said fan assembly in any of a plurality of varying attitudes with respect to said mask in order to enable said fan assembly to direct a stream of air in a selected direction corresponding to a selected one of said plurality of attitudes.

2. A welding helmet or the like according to claim 1 including a grill member carried by said mask and positioned so as to be generally forwardly disposed relative to said fan assembly.

3. A welding helmet or the like according to claim 2 wherein said grill is formed integrally with said mask.

4. A welding helmet or the like according to claim 2 wherein said grill is stationary with respect to said mask.

5. A welding helmet or the like according to claim 1 including a shield member positioned generally in line with said opening and situated generally within the interior of said mask so as to be generally between the face of the operator when said helmet is being worn by said operator and the internal surface of said mask.

6. A welding helmet or the like according to claim 5 wherein said shield is fixedly mounted with respect to said mask.

7. A welding helmet or the like according to claim 6 wherein said shield comprises a plate-like structure including a plurality of mounting tabs spaced from each other effective for engaging the inner surface of said mask at selected points thereof, said plate-like structure including cut-away portions for permitting the flow of air from the interior of said mask and through said opening whenever said motor is energized driving said fan assembly.

8. A welding helmet or the like according to claim 7 wherein said cut-away portions comprise sections which are removed generally peripherally of said plate-like structure.

9. A welding helmet or the like according to claim 8 wherein said cut-away portions comprise first and second pluralities of slots, said first and second pluralities of slots being so situated as to be in respective planes which are spaced to each other and positioned within such planes to be in general staggered relationship.

10. A welding helmet or the like according to claim 5 wherein said shield member is operatively connected to said fan assembly so as to be correspondingly positioned whenever said fan assembly is positioned in a selected one of said plurality of varying attitudes.

11. A welding helmet or the like according to claim 10 wherein said shield member comprises a funnel-like configuration including at its smaller end a tubular portion for operative attachment to said motor, said funnel-like shield member having its larger diameter terminating in a generally circumferential edge spaced away from the interior wall surface of said mask so as to permit air flow therebetween whenever said motor is driving said fan assembly.

12. A welding helmet or the like according to claim 5 wherein said shield member is pivotally connected to said mask and is operatively connected to said motor and fan assembly, said shield member being effective to simultaneously undergo pivotal action with respect to said mask and change the attitude of said fan assembly relative to said mask.

13. A welding helmet or the like according to claim 12 wherein said shield member comprises a disc-like body portion having a centrally disposed tubular portion for supporting said motor, a pair of lever arms extending generally from the periphery of said disc body portion in a direction generally axially of said tubular motor supporting portion, an adjustment tab extending from said disc body to a point in at least close proximity to the interior surface of said mask, and locking means operatively engaging said tab and said mask for frictionally engaging said mask and said tab in order to maintain said shield member and said motor in any selected attitude with respect to said mask.

14. A welding helmet or the like according to claim 1 including a grill member carried by said mask and positioned so as to be generally forwardly disposed relative to said fan assembly, including a shield member positioned generally in line with said opening and situated generally within the interior of said mask so as to be generally between the face of the operator when said helmet is being worn by said operator and the internal surface of said mask.

15. A welding helmet or the like according to claim 14 wherein said shield includes means for effecting operative engagement with said motor and fan assembly in order to thereby experience motion relative to said mask whenever said fan assembly is moved to a selected one of said plurality of varying attitudes with respect to said mask.

16. A welding helmet or the like according to claim 1 including electrical batteries operatively carried by said mask, circuit means for electrically interconnecting said batteries and said motor, and switch means operatively connected to said mask for enabling the selective making and breaking of said circuit means in order to respectively energize and de-energize said motor.

17. A welding helmet or the like according to claim 16 wherein said switch means comprises a fluid mercury type switch assembly positioned correspondingly to any one of a plurality of selected positions to which said mask may be moved, said mercury type switch assembly being effective to automatically open said circuit means to de-energize said motor whenever said helmet is removed from the operator's head and laid to a rest position.

18. A welding helmet or the like according to claim 16 wherein said switch means comprises a mechanically movable switch member engageable with a fixed contact carried by said mask, said movable switch member being actuated toward said contact upon relative motion between said first means and said mask.

19. A welding helmet or the like according to claim 16 wherein said circuit means comprises second switch means, second electrical connecting means operatively connected to said circuit means, said second switch means being effective to open portion of said circuit means whenever said electrical connecting means is connected to an external source of electrical energy remotely situated with respect to said helmet in order to thereby open the circuit means between said batteries and said motor and to permit said external source of electrical energy to drive said motor.

20. A welding helmet or the like according to claim 16 wherein said circuit means comprises second switch means, second electrical connecting means operatively connected to said circuit means, said second switch means being effective to open portions of said circuit means whenever said electrical connecting means is connected to an external source of electrical energy remotely situated with respect to said helmet in order to thereby open the circuit means between said motor and said batteries and to permit said external source of electrical energy to electrically recharge said batteries.

21. A welding helmet or the like according to claim 16 wherein said circuit means comprises second switch means and third switch means, first and second electrical connecting means operatively connected to said circuit means, said second switch means being effective to open certain portions of said circuit means wherever said first electrical connecting means is connected to an external source of electrical energy remotely situated with respect to said helmet in order to thereby open the circuit means between said batteries and said motor and to permit said external source of electrical energy to drive said motor, said third switch means being effective to open other portions of said circuit means whenever said second electrical connecting means is connected to said external source of electrical energy in order to thereby open the circuit means between said motor and said batteries and to permit said external source of electrical energy to electrically re-charge said batteries.

22. A welding helmet or the like according to claim 1 including electrical batteries carried by said mask, circuit means for electrically interconnecting said batteries and said motor, switch means operatively connected to said mask for enabling the selective making and breaking of said circuit means in order to respectively energize and de-energize said motor, wherein said first means comprises an operator head-engaging portion, pivot means pivotally interconnecting said head-engaging portion and said mask so as to afford relative pivotal motion between said mask and said head-engaging portion, said batteries being so situated with respect to said motor and fan assembly as to have said pivot means disposed generally between said motor and fan assembly on one side and said batteries on another side, said batteries thereby acting as a counterbalancing weight to said motor and fan assembly whenever said mask is pivotally rotated about said pivot means toward a direction approaching a more nearly horizontal position.

23. A welding helmet or the like according to claim 22 wherein said switch means comprises a cam member operatively secured to said head-engaging portion for rotation therewith, a fixed electrical contact carried by said mask, a movable electrical contact carried by said mask, said cam member being effective to engage and urge said movable electrical contact toward engagement with said fixed electrical contact whenever said head-engaging portion and said mask have been pivotally rotated relative to each other a predetermined distance.

24. A welding helmet or the like according to claim 1 wherein said second means comprises a ball and socket mounting arrangement, said mounting arrangement comprising an outer socket-like member carried by said mask, an annular bearing member having an outer surface of generally spherical configuration, said annular bearing member being generally peripherally contained along said spherical surface by said outer socket-like member, an annular inner surface formed on said annular bearing member defining an aperture therethrough, a generally tubular grill member having an open tubular end secured to said annular bearing member and having a generally closed-in end extending beyond said annular bearing member forwardly thereof, and bracket support means operatively connected to said annular bearing member so as to be movable therewith for supporting said motor generally within said aperture in said bearing member and said fan assembly generally within said grill.

25. A welding helmet or the like according to claim 24 wherein said tubular open end of said grill is secured to said annular inner surface of said annular bearing member, including abutment means carried by said annular bearing member and said socket-like member for limiting the relative angular movement between said annular bearing member and said socket-like member.

26. A welding helmet or the like according to claim 1 wherein said second means comprises a first generally annular support member carried by said mask, in fixed relationship thereto, a second annular support member operatively carried by said first annular support member, keying means for permitting said second annular support member to be rotationally positionable with respect to said first annular support member, a fan protecting grill operatively carried by said second annular support member, and projecting forwardly thereof, and supporting means operatively connected to said second annular member for rotation therewith, said supporting means being situated generally within said second annular support member and operatively connected to said motor and fan assembly, said supporting means being effective for supporting said motor and fan assembly in a position so as to have the centerline of said motor and fan assembly at a fixed inclined angle with respect to the centerline of said first and second annular support members.

27. A welding helmet or the like according to claim 1 wherein said second means comprises a first generally annular outer support member, first pivot means operatively connecting said mask to said first annular outer support member, a second generally annular inner support member, second pivot means operatively connecting said second inner support member to said first outer support member, said first and second pivot means being so arranged as to have the axis of said first pivot means generally perpendicular to the axis of said second pivot means, a fan-protecting grill operatively connected to said second inner support member for movement therewith and extending forwardly thereof, and supporting means operatively connected to said second inner support member for movement therewith, said supporting means extending generally inwardly of said second inner support member and operatively supporting said motor and fan assembly so as to fix said motor and fan assembly relative to said second inner support member.

References Cited

UNITED STATES PATENTS

| | | | |
|---|---|---|---|
| 737,373 | 8/1903 | Eagle et al. | 128—142.3 |
| 908,108 | 12/1908 | Knudsen | 128—142.3 |
| 2,514,990 | 7/1950 | Dewan | 2—8 XR |
| 3,238,535 | 3/1966 | Richey | 2—8 |

FOREIGN PATENTS

| | | |
|---|---|---|
| 449,456 | 6/1948 | Canada. |

JAMES R. BOLER, Primary Examiner

U.S. Cl. X.R.

98—115; 128—142.3